United States Patent [19]

Caine

[11] 4,066,552
[45] Jan. 3, 1978

[54] COMBINED PUMP AND SELF-CLEANING CENTRIFUGAL CONTAMINATION SEPARATOR

[75] Inventor: Gerard H. Caine, Rockford, Ill.

[73] Assignee: Sundstrand Corporation, Rockford, Ill.

[21] Appl. No.: 593,529

[22] Filed: July 7, 1975

Related U.S. Application Data

[63] Continuation of Ser. No. 505,984, Sept. 13, 1974, abandoned, which is a continuation of Ser. No. 168,933, Aug. 4, 1971, abandoned.

[51] Int. Cl.² .................. B01D 21/02; B01D 23/26; B01D 33/38; B01D 43/04
[52] U.S. Cl. .................................... 210/304; 55/242; 55/406; 210/409; 210/414; 210/415; 233/15; 415/121 G; 415/143; 415/215
[58] Field of Search ............... 233/2, 3, 15; 210/297, 210/304, 355, 360 R, 360 A, 369, 456, 372, 373, 378, 407, 409, 413–415, 512; 55/220, 242, 400, 406; 415/143, 215, 121 G

[56] References Cited

U.S. PATENT DOCUMENTS

| | | | |
|---|---|---|---|
| 2,975,899 | 3/1961 | Cannon et al. | 210/415 |
| 3,029,951 | 4/1962 | Cannon | 210/415 |
| 3,092,578 | 6/1963 | Cannon et al. | 210/415 |
| 3,102,491 | 9/1963 | Adams | 210/304 |
| 3,159,572 | 12/1964 | Ranhagen | 210/415 |
| 3,261,294 | 7/1966 | Schofield et al. | 415/215 |
| 3,633,754 | 12/1969 | Marsh | 210/360 R |
| 3,639,089 | 2/1972 | Lock | 418/93 |

*Primary Examiner*—Frank W. Lutter
*Assistant Examiner*—Frank Sever
*Attorney, Agent, or Firm*—Wegner, Stellman, McCord, Wiles & Wood

[57] ABSTRACT

A rotating centrifugal impeller spins contaminated fluid at high speed around the outside of a stationary cylindrical particle barrier filter screen and by centrifugal action separates the solid contaminants for removal to a dirt accumulator. Simultaneously, the impeller pumps or propels the remaining clean fluid radially inward, causing it to turn abruptly from its tangential path and to flow through the screen openings to a central chamber from which the fluid is discharged. Even though some of the solid particles may be smaller than the screen openings, they cannot turn radially inward from their trajectories sharply enough to pass through the openings and instead will be contained in their tangential path until centrifuged outward. The barrier screen has a smooth external surface so that it may be washed clean by the high velocity tangential flow of the spinning fluid across the screen, thus preventing any particle build-up on the screen and clogging thereof during start-up and shut-down.

7 Claims, 1 Drawing Figure

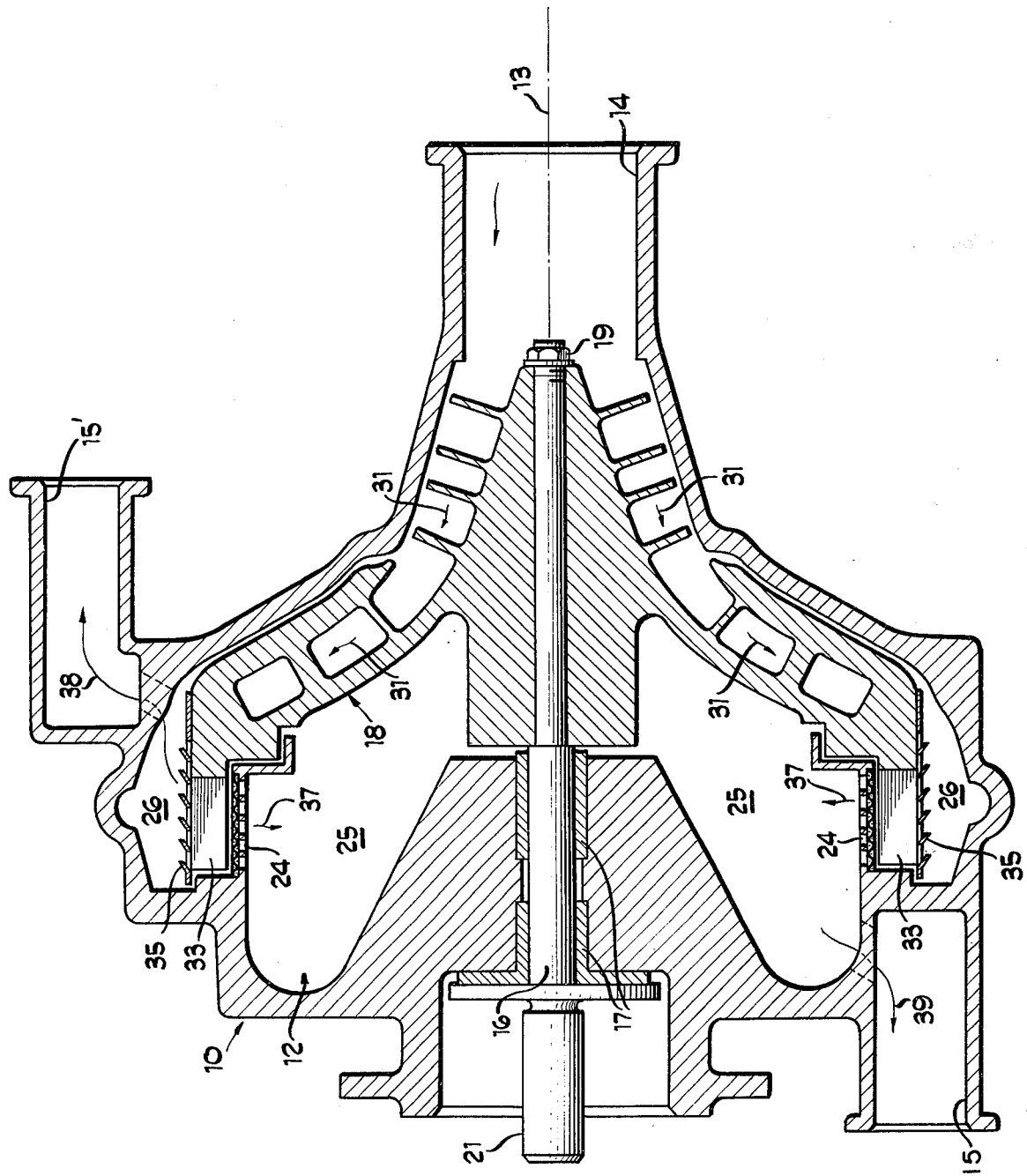

COMBINED PUMP AND SELF-CLEANING CENTRIFUGAL CONTAMINATION SEPARATOR

BACKGROUND OF THE INVENTION

This application is a continuation of my application Ser. No. 505,984 filed Sept. 13, 1974, now abandoned in turn a continuation of my application Ser. No. 168,933, filed Aug. 4, 1971, now abandoned.

This invention relates to a rotary pump-separator for pumping contaminated fluid while at the same time removing the solid contaminants or dirt therefrom to provide a supply of clean fluid. The invention is particularly attractive when incorporated in a pump-separator for processing fuel in an aircraft and will be described in that environment.

In one previously developed centrifugal separator, contaminated fluid is revolved around a rotating cylindrical or drum-shaped filter screen so that the heavier solid particles are thrown radially outward by centrifugal force where those particles are collected and removed. Meanwhile, the clarified or clean liquid is drawn radially inward through the rotating filter screen and is discharged. The filter screen, which usually comprises a metal mesh, serves as a barrier to any of the solid contaminants that do not immediately centrifuge outward. With such a screen, large particles of dirt cannot enter the clean fluid discharge port before the separator has started or reached full operating speed.

Unfortunately, some of the contaminants tend to adhere to the screen and its openings or interstices become increasingly obstructed with contaminants. The accumulated trapped particles then act as a filter bed, trapping smaller particles and eventually resulting in flow blockages or decreases and in excessive pressure drops. Removal of contaminants from the screen's surface has been accomplished in the past by high pressure reverse flows or back flushings, detergents, emulsifiers, vibrations and scrubbings, but these methods are effective only for relatively coarse mesh filter screens. When very fine mesh barrier screens are used, such cleaning methods are ineffective or only partially effective due to the extremely strong surface adhering properties of small contaminant particles, resulting from surface tensions, surface molecular attractions, electrostatic charges, magnetic characteristics, etc. These surface adhering effects cause very fine particles to adhere strongly to the surfaces of the screen openings, even where the particles are much smaller than the openings. The particles then clump and adhere to each other, finally bridging across the openings and trapping more particles by the filter bed effect until most of the openings in the screen are completely blocked by the resulting aggregate which is compacted by high pressure drops and high velocity heads through the few remaining unblocked openings. This makes removal of the compacted aggregates difficult and incomplete, even where accomplished by high pressure reverse flows, detergents, emulsifiers, vibrations and scrubbings. Moreover, detergents or emulsifiers may introduce undesirable contamination in some environments.

The present invention constitutes a significant improvement over all prior pump-separator systems in that, among other things, it has a self-cleaning feature that is totally effective and yet is achieved by means of a relatively simple, economical and uncomplicated arrangement.

It is, therefore, an object of the invention to provide a unique combined pump and self-cleaning centrifugal contamination separator which is economical in construction and reliable in operation.

It is another object to provide a pump-separator unit having enhanced immunity against the blocking or plugging effects caused by the solid contaminants in the contaminated fluid handled.

SUMMARY OF THE INVENTION

A combined pump-separator constructed in accordance with the invention comprises a housing having a longitudinal axis and enclosing a cavity which is generally symmetrical about that axis. There is an inlet in the housing communicating with the cavity and for receiving fluid subject to contamination by the presence therein of undesirable suspended solid particles. There are means, including a stationary cylindrical particle barrier screen fixed with respect to the housing and coaxial with the cavity, for providing within the cavity an inner chamber radially inward of the barrier screen and an outer generally annular chamber radially outward of and encircling the screen. First and second discharge outlets in the housing communicate with the inner and outer chambers respectively. Means, including a rotating centrifugal impeller within the cavity, are provided for spinning the contaminated fluid around the outer annular chamber at a relatively high tangential velocity and at the same time pumping that fluid radially inward toward the inner chamber. As a consequence, the solid contaminants centrifuge radially outward to facilitate their separation and removal through the second discharge outlet, while the remaining clean fluid passes radially inward through the barrier screen to the inner chamber from which it may be exhausted through the first discharge outlet. The barrier screen has a smooth external surface so that the high velocity tangential flow of the spinning fluid washes across and cleans the screen to prevent any of the solid contaminants from collecting thereon and adhering thereto.

DESCRIPTION OF THE DRAWING

The features of the invention which are believed to be novel are set forth with particularity in the appended claims. The invention, together with further objects and advantages thereof, may best be understood, however, by reference to the following description in conjunction with the accompanying drawing, the single FIGURE of which is a sectional view of a combined pump and separator constructed in accordance with the invention and suitable for pumping and decontaminating fuel in an aircraft installation.

DESCRIPTION OF THE ILLUSTRATED EMBODIMENT

The disclosed pump-separator includes a housing 10 shown for convenience as constituting a single member with all of its parts integrally related to each other. Of course, in order that the housing itself may be fabricated and to facilitate assembling of the entire pump-separator, housing 10 would include at least two parts (preferably castings) fastened together, such as by bolts and nuts. The relatively large cavity 12 formed in and enclosed by housing 10 is generally symmetrically shaped about the housing's longitudinal axis, indicated by dashed construction line 13. A central fuel inlet 14 at the right end of the housing permits fuel delivery into cavity 12 along axis 13. The received fuel is apt to be contaminated by the inclusion therein of undesirable suspended solid particles or contaminants. A pair of discharge outlets 15 and 15', formed in and located at different points around the outermost circumference of housing 10, communicate with different portions of cavity 12. For convenience of illustration, the discharge ports have been shown in the drawing as being in the same plane and 180° apart. As will be readily appreciated, outlets 15 and 15' may be positioned at any desirable points around the housing.

Housing 10 is bored, at its left end, along axis 13 for receiving the impeller shaft 16 journaled for rotation by means of sleeve bearings 17 affixed to housing 10. A centrifugal impeller 18 is threaded onto the right end of shaft 16 and retained by a nut 19. The left end of the shaft is shaped to provide a splined section 21 to facilitate connection of shaft 16 to a suitable driving means (not shown), thereby to effect operation of the pump-separator.

A stationary cylindrical particle barrier filter screen 24 is rigidly affixed to housing 10 and is coaxial with cavity 12. Rotating impeller 18, barrier screen 14 and the shape of housing 10 effectively provide within cavity 12 an inner chamber 25 radially inward of the barrier screen and an outer generally annular chamber 26 radially outward of and encircling the screen, the screen effectively forming a common boundary between the inner and outer chambers.

Centrifugal impeller 18 may take any of a variety of different well known constructions, each of which customarily comprises helical or spiral vanes for pumping contaminated fluid from inlet 14 and along the flow path indicated by arrows 31 to outer annular chamber 26. Preferably, impeller 18 includes a series of radial and curved blades or vanes 33 that extend and revolve in chamber 26. These blades are shaped to effect spinning of the fuel around the outside of cylindrical screen 24 and impeller 18 pumps that fuel radially inward toward inner chamber 25 which communicates with main outlet 15. In other words, impeller 18 subjects the processed fluid to two different force vectors 90° apart. A cylindrical louvered or perforated screen 35 is rigidly attached to impeller 18 and rotates in chamber 26 along with blades 33. Discharge outlet 15 communicates with inner chamber 25 while outlet 15' is fluidly coupled to outer chamber 26.

In operation, when centrifugal impeller 18 is driven in initially pumps the contaminated fuel from inlet 14 to outer annular chamber 26 wherein the fuel is spun at a relatively high tangential velocity. To assist in achieving the required high tangential velocity, the housing may take the form of a high and constant fluid velocity volute. Louvered screen or drum 35 aids in containing the revolving fluid during separating and serves to isolate it from the effects of the stationary walls of the housing. The revolving contamination in the fluid in chamber 26 tends to be impelled radially outward as a result of centrifugal force but the pumping effect of impeller 18 forces and directs liquid radially inward, as schematically indicated by arrows 37 toward the main outlet 15. Due to the greater specific weight of the solid contaminants, however, the centrifugal force imparted thereto will not be overcome by the radially inward fluid flow. As a consequence, those solid particles of contamination will centrifuge radially outward through louvered screen 35 to the outermost periphery of annular chamber 26 from which they are conveyed (as indicated by arrow 38) through outlet 15' to a dirt accumulator (not shown) in well known fashion. A very small amount of liquid will be bled off through screen 35 with the solid particles.

With the present invention, particles will be barred by screen 24 and centrifuged outward for removal even though some of those particles may be much smaller than the screen openings. By moving the fluid in chamber 26 at a very high velocity parallel or tangent relative to the screen's surface, only the molecules of the liquid will be able to turn radially inward abruptly or fast enough to pass through the screen openings. The particles of contamination, because of their higher density, will continue to revolve (thus lengthening the containment or hold time) until centrifugal forces move them outwardly and separate them against the viscous drag of the fluid. In this way, very high separating efficiency is obtained and screen 24 effectively discriminates against and bars the passage of particles substantially smaller than the screen openings.

If desired, the mixture emerging at outlet 15' may be supplied to an auxiliary separator (such as a cyclone or multi-cyclone separator, or a centrifuge or settling tank) wherein only the solid particles are delivered to a dirt sump while the liquid is extracted and recirculated or recycled back to inlet 14 by means of a recirculating pump. Hence, no fuel is lost or wasted.

With the removal of the solid contaminants from the contaminated fluid by centrifugal action, the fluid pumped radially inward through the openings of screen 24 and into chamber 25 is free of solid particles and thus clean. It is discharged in conventional manner through outlet 15, as is schematically depicted by arrow 39.

It is to be particularly noted that the high separating efficiency attained by the invention renders the bled-off flow at outlet 15' highly concentrated with solid contaminants and constituting a very small portion of the primary or throughflow. This permits a significant reduction (from previous systems) in the flow rate, size and power consumption of the recirculating pump. Moreover, it improves the efficiency of the auxiliary separator.

If filter screen 24 was of conventional construction (namely formed of metal mesh), some of the solids would likely collect on and adhere to the external surface of the screen during start-up and shut-down, ultimately clogging it and cutting off the flow of fuel to inner chamber 25. This cannot happen, however, in the disclosed pump-separator. In accordance with a salient feature of the invention, screen 24 is effectively made immune to the effects of the solid particles in the contaminated fluid. Such immunity is achieved by constructing the screen to have a smooth external surface, as distinguished from the rather rough or coarse external surfaces of the cylindrical metal mesh filter screens generally used heretofore. The required smooth surface may most easily be obtained by having screen 24 take the form of a washed flow screen. With a smooth surfaced screen the high velocity tangential flow of the spinning fluid in chamber 26 washes across and cleans the screen to prevent any of the solid contaminants from collecting thereon. If any particles come to rest or settle on the screen's surface during shut-down or start-up, they will be immediately washed off the very next time the separator reaches full operating speed.

It is to be noted that the washing fluid flow has a high velocity component at right angles to the centrifugally induced gravity field. The same vanes 33, which move the fluid parallel or tangent relative to the screen's surface to achieve increased particle separation efficiency, are also employed to achieve the high washing flow velocity.

It is thus apparent that the invention provides a unique combined rotary pump and centrifugal separator in which a cylindrical particle barrier filter screen, through which clean fluid flows, is effectively immunized against the clogging effects of solid contaminants which are forced to revolve until they centrifuge and separate from the clean fluid.

While a particular embodiment of the invention has been shown and described, modifications may be made, and it is intended in the appended claims to cover all such modifications as may fall within the true spirit and scope of the invention.

I claim:

1. A combined pump and self-cleaning centrifugal contamination separator for a fluid subject to contamination by the presence therein of undesirable suspended solid particles, comprising:
   a housing having a longitudinal axis and enclosing a cavity which is generally symmetrical about said axis;
   an inlet in said housing communicating with said cavity, said inlet receiving said fluid;
   means, including a stationary cylindrical particle barrier screen fixed in said housing and coaxial with said cavity, dividing said cavity into an inner chamber radially inward of said barrier screen and an outer generally annular chamber radially outward of and encircling said screen, said barrier screen having apertures therethrough and a smooth external surface;
   a first discharge outlet in said housing communicating with said inner chamber;
   a second discharge outlet in said housing communicating with said outer chamber; and
   means, including a rotating centrifugal impeller within said cavity, for pumping fluid from the inlet to the outlets, the impeller having thereon a plurality of vanes revolving in said outer chamber for spinning the contaminated fluid around the outer chamber, washing the external surface of the screen to prevent solid contaminants from collecting thereon and adhering thereto, the fluid spinning in the outer chamber turning 90° to pass inward through said barrier screen to said first discharge outlet, contaminant particles being prevented by inertia from turning to pass through the screen with the fluid, whereby contaminant particles substantially smaller than the screen apertures are separated from the fluid and the contaminants are centrifuged radially outward to facilitate separation and removal through said second discharge outlet.

2. The combined pump and contamination separator of claim 1 in which said barrier screen is of the washed flow type and in which any contaminants that may settle on the external surface of the washed flow screen, during shut down when said impeller ceases rotation, are removed therefrom by the spinning fluid when rotation resumes and full operating speed is reached.

3. The combined pump and contamination separator of claim 1 in which said inner chamber is generally symmetrical around said longitudinal axis.

4. The combined pump and contamination separator of claim 3 in which said cavity, said inlet, said barrier screen, said outer annular chamber and said impeller all share the same axis.

5. The combined pump and contamination separator of claim 3 in which said vanes extend axially of the housing from the impeller, adjacent the external surface of the barrier screen.

6. The combined pump and contamination separator of claim 1 in which a cylindrical louvered screen affixed to said impeller revolves in said outer annular chamber, the separated contaminants passing through the louvered screen to said second discharge outlet.

7. A combined pump and self-cleaning centrifugal contamination separator for a fluid subject to contamination by the presence therein of undesirable suspended solid particles, comprising:
   a housing having a longitudinal axis and enclosing a cavity which is generally symmetrical about said axis;
   an inlet in said housing communicating with said cavity, said inlet receiving said fluid;
   means, including a stationary annular particle barrier screen fixed in said housing and coaxial with said cavity, dividing said cavity into a first chamber and a second chamber radially outward of and encircling said screen, said barrier screen having apertures therethrough and a smooth surface in said second chamber;
   a first discharge outlet in said housing communicating with said first chamber;
   a second discharge outlet in said housing communicating with said second chamber; and
   means, including a rotating centrifugal impeller within said cavity for pumping fluid from the inlet to the outlets, the impeller spinning the contaminated fluid around the second chamber, washing the smooth surface of the screen to prevent solid contaminants from collecting thereon and adhering thereto, the fluid spinning in the second chamber turning 90° to pass through said barrier screen to said first discharge outlet, contaminant particles being prevented by inertia from turning to pass through the screen with the fluid, whereby contaminant particles substantially smaller than the screen apertures are separated from the fluid and the contaminants are centrifuged radially outward to facilitate separation and removal through said second discharge outlet.

* * * * *